United States Patent
Wegner et al.

[11] Patent Number: 6,063,230
[45] Date of Patent: *May 16, 2000

[54] SUBSTRATES COATED WITH TWO OR MORE COATS AND PROCESS FOR PRODUCING THESE SUBSTRATES

[75] Inventors: Egon Wegner; Leonidas Kiriazis, both of Münster, Germany

[73] Assignee: BASF Coatings AG, Muenster-Hiltrup, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/750,906
[22] PCT Filed: Jul. 4, 1995
[86] PCT No.: PCT/EP95/02582
 § 371 Date: Jan. 8, 1997
 § 102(e) Date: Jan. 8, 1997
[87] PCT Pub. No.: WO96/01737
 PCT Pub. Date: Jan. 25, 1996

[30] Foreign Application Priority Data

Jul. 9, 1994 [DE] Germany ............... 44 24 299

[51] Int. Cl.⁷ .................................................. B29C 65/02
[52] U.S. Cl. .......................... 156/280; 427/322; 427/327; 427/379; 427/388.1; 427/393.5; 427/409; 428/332; 428/336; 428/423.1; 428/425.5; 428/461; 428/523
[58] Field of Search ..................... 428/332, 336, 428/423.1, 425.5, 461, 523; 427/379, 388.1, 393.5, 409, 412.1, 322, 327; 156/280

[56] References Cited

U.S. PATENT DOCUMENTS

| | | | |
|---|---|---|---|
| 4,751,121 | 6/1988 | Kuhnel | 428/40 |
| 4,917,944 | 4/1990 | Breitscheidel | 428/308.4 |
| 5,047,294 | 9/1991 | Schwab | 428/432.1 |
| 5,169,922 | 12/1992 | Hille | 528/75 |
| 5,268,215 | 12/1993 | Krenceski et al. | |
| 5,368,944 | 11/1994 | Hartung | 428/423.1 |
| 5,490,893 | 2/1996 | Enlow | 156/230 |

FOREIGN PATENT DOCUMENTS

| | | |
|---|---|---|
| 0 203 399 | 12/1986 | European Pat. Off. |
| 0 291 927 | 11/1988 | European Pat. Off. |
| 33 26 392 | 1/1985 | Germany . |
| 40 06 809 | 9/1991 | Germany . |
| WO 89/06598 | 7/1989 | WIPO . |
| WO 94/19113 | 9/1994 | WIPO . |

Primary Examiner—Patricia A. Short

[57] ABSTRACT

The invention relates to substrates coated with two or more coats, which coated substrates are characterized in that they can be produced by A laminating a plastic film having a thickness of from 2 to 500 μm onto the surface of the substrate, B coating the surface of the plastics film which is applied by lamination, if desired, with a filler composition which is suitable for the coating of automobile bodies, C coating the surface of the plastics film applied by lamination or, respectively, the filler coat obtained after carrying out step B with at least one pigmented coat of paint, D coating, if desired, the coat of paint obtained after carrying out step C with a transparent coating material, and E curing the coat or coats of paint applied to the surface of the plastics film which is applied by lamination.

12 Claims, No Drawings

SUBSTRATES COATED WITH TWO OR MORE COATS AND PROCESS FOR PRODUCING THESE SUBSTRATES

FIELD OF THE INVENTION

The present invention relates to substrates coated with two or more coats, to a process for the production of these substrates and to the use of the substrates coated with two or more coats for the production of automobiles.

BACKGROUND AND SUMMARY OF THE INVENTION

EP-A-374 551 discloses coated substrates which are suitable for the production of fitments for automobile bodies. The coated substrates described in EP-A-374 551 consist of metal panels which are coated with at least one coat, or of composite materials whose surface layer consists of the coated metal panels.

The object of the present invention was to provide substrates coated with two or more layers, which, in relation to the coated substrates disclosed in EP-A-374 551, have improved properties, and in whose production only small quantities of solvents are emitted and simple quality monitoring is possible.

This object is achieved in accordance with the invention by the provision of substrates coated with two or more coats, which are characterized in that they can be produced by A laminating a plastics film having a thickness of from 2 to 500 μm onto the surface of the substrate, B coating the surface of the plastics film which is applied by lamination, if desired, with a filler composition which is suitable for the coating of automobile bodies, C coating the surface of the plastics film applied by lamination or, respectively, the filler coat obtained after carrying out step B with at least one pigmented coat of is paint, D coating, if desired, the coat of paint obtained after carrying out step C with a transparent coating material, and E curing the coat or coats of paint applied to the surface of the plastics film which is applied by lamination.

The present invention also relates to a process for the production of substrates coated with two or more coats, which is characterized in that A a plastics film having a thickness of from 2 to 500 μm is laminated onto the surface of a substrate, B the surface of the plastics film which is applied by lamination is coated, if desired, with a filler composition which is suitable for the coating of automobile bodies, C the surface of the plastics film applied by lamination or, respectively, the filler coat obtained after carrying out step B is coated with at least one pigmented coat of paint, D if desired, the coat of paint obtained after carrying out step C is coated with a transparent coating material, and E the coat or coats of paint applied to the surface of the plastics film which is applied by lamination are cured, it being possible for the curing of the filler coat applied in step B to be carried out prior to the coating with at least one pigmented coat of paint, and for the curing of the pigmented coat of paint applied in step C to be carried out prior to the coating with the transparent coating material.

The present invention also relates to the use of the substrates coated in accordance with the invention for the production of motor-vehicle bodies, preferably automobile bodies, and for the production of fitments for motor-vehicle bodies.

DETAILED DESCRIPTION

The coated substrates in accordance with the invention are distinguished by a very high resistance to stone chipping and corrosion. Further advantages of the coated substrates in accordance with the invention consist in the fact that they can be produced in plants occupying little space, that, in the course of the production of the coated substrates in accordance with the invention, by employing a plastics film in step A, only very small quantities of organic solvents are emitted, and that the quality monitoring can begin even with the plastics film employed in step A, whereas when coating materials are employed the quality of the coating cannot be assessed until after the coat of paint has cured, and in the case of quality defects the coated substrate as a whole must be discarded.

In step A of the process for the production of the coated substrates in accordance with the invention it is possible in principle to employ all substrates which are suitable for the production of motor-vehicle bodies and for the production of fitments for motor-vehicle bodies. Examples are optionally pretreated metal panels, for example optionally pretreated steel panels and aluminum panels, and also moldings of plastic. It is preferred to employ moldings of plastic, and very particularly preferred to employ optionally pretreated metal panels, especially optionally pretreated steel panels, as substrates. The metal panels can be pretreated, for example, by phosphatizing and/or chromatizing.

In step A, it is possible to employ a film of a polyolefin, a polyamide, a polyurethane, a polyester, a polyacrylate, a polycarbonate or a mixture of different polymeric substances. The plastics film employed in step A has a thickness of 2–500, preferably 20–250, μm and may contain dyes and/or pigments. Adhesion to the substrate may be realized in different ways. One possibility, for example, consists in employing films which contain adhesion-promoting groups, for example urethane groups, acid anhydride groups or carboxyl groups, or films which have been provided with adhesion-promoting groups by coextrusion with a polymer which contains adhesion-promoting groups. The adhesion between the film and the substrate can also be achieved by using an adhesive. In this case, the adhesives employed may be both those which are solid at room temperature and those which are liquid at room temperature.

The lamination of the plastics film can be effected by generally well-known methods. When laminating films which have adhesion-promoting groups, the substrate is generally covered with the film such that the adhesion-promoting layer is in contact with the substrate surface. Then, by applying pressure and heat with the aid of temperature-regulatable presses, or in the roll nip of a roller unit or calender with the aid of temperature-regulatable rolls, the film is laminated onto the substrate. In this context, pressure and temperature should be chosen such that a solid bond is produced between the substrate and the film. When using adhesives which are solid at room temperature the procedure is similar. When liquid adhesives are employed, the procedure is generally such that the liquid adhesive is applied to the substrate and the plastics film is laminated onto the heated substrate coated with the adhesive.

In step B, the plastics film applied by lamination can be coated with a filler composition which is suitable for the coating of automobile bodies. In the conventional coating of automobile bodies, the primer applied by electrodeposition is coated with a filler composition. The filler coat obtained in this way has essentially two functions: on the one hand, it should compensate for the unevennesses of the electrodeposition primer, and on the other hand it should improve the stone chip resistance of the overall finish. Filler compositions for the production of filler coats in the coating of automobile bodies are known in large numbers and therefore require no further description in detail here. Filler compositions essentially consist of a binder, a crosslinking agent, pigments and fillers, and also, if desired, other additives, for example crosslinking catalysts and leveling auxiliaries. The filler compositions which can be employed may contain, as binders, for example, epoxy resins, polyester resins, polyurethane resins, polyacrylate resins and alkyd resins, or combinations of such resins. As crosslinking agents, the filler compositions which may be employed may contain amino resins, for example melamine-formaldehyde resins, amines, polyisocyanates, and compounds containing carboxyl groups. Examples of pigments which may be present in the filler compositions which can be employed are titanium dioxide, phthalocyanines, iron oxides and carbon black. As fillers, the filler compositions may contain, for example, lime or barium sulfate.

The coated substrates according to the invention surprisingly have a good resistance to stone chipping even if no filler composition is applied in step B.

To the surface of the plastics film applied by lamination, or to the filler coat obtained after step B has been carried out, there is applied either at least one pigmented topcoat or a so-called basecoat-clearcoat finish, which consists of a pigmented basecoat and of a transparent topcoat applied over it.

In step C it is possible to use any topcoat and/or basecoat which is suitable for the conventional coating of automobile bodies. Such coating materials are well known to those skilled in the art and are commercially available in large numbers. They essentially contain a polymeric binder, a crosslinking agent if desired, and a pigment or a mixture of pigments. The topcoat and/or basecoat employed in step C may contain, as binder, for example, a polyester resin, a polyurethane resin or a polyacrylate resin, or a mixture of such binders. As crosslinking agent, the topcoat and/or basecoat may contain an amino resin, a polyisocyanate resin, a crosslinking agent which contains carboxyl groups, or a mixture of such crosslinking agents. Examples of pigments which may be present in the pigmented topcoat and/or basecoat applied in step C are titanium dioxide,. phthalocyanine pigments, carbon black, iron oxide pigments, aluminum flake pigments and pearlescent pigments.

If the coated substrates according to the invention are to be provided with a basecoat-clearcoat finish, in step E a transparent coat is applied to the coat of paint applied in step D. Here too, it is possible to employ all transparent coating materials which can be employed for the conventional coating of automobiles. It is also possible to employ powder clearcoats. The transparent coating materials applied in step E also consist of a binder, a crosslinking agent if desired, and further conventional additives. Such coating materials are commercially available in large numbers and are well known to the person skilled in the art. They therefore require no further description at this point.

In step E, the coat or coats applied to the surface of the plastics film which is applied by lamination is or are cured, it being possible for the curing of the filler coat applied in step B to be carried out prior to coating with at least one pigmented coat of paint, and for the curing of the pigmented basecoat applied in step C to be carried out prior to coating with the transparent coating material. It is also possible to apply over the filler coat applied in step B, in the uncured state, a basecoat, and then to cure filler coat and basecoat together prior to applying the transparent coat. The coats are cured customarily by heating at temperatures of from 60 to 230° C. In this context, in the case of coating materials which contain a crosslinking agent, a reaction takes place between the binders and crosslinking agents present in the coating materials, and three-dimensional polymeric networks are formed which give the coated surface a particularly high resistance to mechanical or chemical attack. In the case of coating materials which do not contain crosslinking agents, physical drying of the coating films takes place in the course of the curing process.

The coats can be applied by spraying, dipping, flow-coating, rolling or knife-coating. In the production of metal panels coated with two or more coats, the coats are preferably applied by means of the strip coating process (coil-coating process).

The coated substrates according to the invention can be used for the production of fitments for motor-vehicle bodies. To this end they can be deformed and processed further, if desired with the aid of further materials, for example fiber-reinforced plastics, to give valuable composite materials. Deformation and possible further processing can be carried out both after step E and after step A. It is preferred to carry out deformation and possible further processing after step E. If the deformation and possible further processing are carried out after step A, steps B–E are carried out on the deformed and/or further-processed semi-finished product.

The invention is illustrated in more detail in the embodiment examples which follow. All indications of percentages and parts are to be understood as indications by weight, unless expressly stated otherwise.

EXAMPLE 1

A white-pigmented thermoplastic 60 μm thick polyurethane film (Elastollan$^R$ EL 1184A from Elastogran GmbH) is laminated at a temperature of 220° C. and at a pressure of 50 bar onto a bodywork panel (Bonder 2660 OC). The surface of the plastics film applied by lamination is then coated with a commercial white-pigmented nonaqueous topcoat (dry film thickness: 45–50 μm). The applied coated paint is then baked at 130° C. for 30 minutes.

EXAMPLE 2

A white-pigmented thermoplastic 60 μm thick polyurethane film (Elastollan$^R$ EL 1184A from Elastogran GmbH) having a 20 μm thick adhesion-promoting layer comprising a polyester based on 1,4-butanediol and terephthalic acid/isophthalic acid (1:1) is pressed at a temperature of 150° C. and at a pressure of 25 bar onto a bodywork panel (Bonder 2660 OC). The surface of the plastics film applied by lamination is then coated with a commercial white-pigmented nonaqueous topcoat (dry film thickness: 45–50 μm). The applied coat of paint is then baked at 130° C. for 30 minutes.

TESTING OF THE COATED SUBSTRATES

The coated substrates prepared according to Example 1 and Example 2 showed excellent resistance values both in the VDA [German Car Manufacturers' Association] stone chip test (2×500 g at 2 bar) and in the Mercedes Benz ball shot test (VDA: Rating 1; ball shot test: degree of rusting=0, degree of chipping: $\leq 2$ mm$^2$). In order to test the corrosion resistance, the coated substrates were subjected to a salt spray mist test in accordance with DIN 50 021. After 6 weeks, no undercoat rusting could be determined.

What is claimed is:

1. A process for the production of a coated substrate, comprising the steps of:
    a) in a first step, laminating a plastic film having a thickness of from 2 to 500 μm onto a surface of a substrate,
    b) in a subsequent step, coating the surface of the laminated plastic film with at least one pigmented layer of paint, and
    c) curing the applied paint.
2. A process according to claim 1, further comprising a step of coating the pigmented layer of paint in step b) with a transparent coating material.
3. A process according to claim 2, wherein the pigmented coat of paint is cured prior to coating with the transparent coating material.
4. A process according to claim 1, further comprising a step of applying a filler composition between step a) and step b) to produce a filler coat.
5. A process according to claim 4, wherein the filler coat is cured prior to step b).
6. A process according to claim 1, wherein the substrate comprises a metal panel.
7. A process according to claim 6, wherein the paint is applied with a strip coating process (coil-coating process).
8. A process according to claim 1, wherein the substrate comprises a molding of plastic.
9. A process according to claim 1, wherein the film comprises a thermoplastic polyolefin film or a thermoplastic polyurethane film.
10. A process for producing fitments for motor-vehicle bodies, comprising the steps of:
    a) producing a coated substrate according to claim 1, and
    b) forming the coated substrate into a fitment.
11. A process according to claim 10, wherein the motor-vehicle bodies comprise automobile bodies.
12. A process for the production of a substrate coated with one or more coats, comprising the steps of
    a) laminating a plastics film of a thermoplastic polyurethane or thermoplastic polyolefin having a thickness of from about 2 to about 500 μm as a first coating layer onto the surface of a substrate, and thereafter
    b) coating the surface of the laminated plastics film with at least one pigmented coat of paint, and thereafter
    c) curing the coat or coats of paint applied to the surface of the laminated plastics film,
    wherein the substrate of step a) is selected from the group consisting of metal panels and moldings of plastic.

* * * * *